(12) United States Patent
Cannon et al.

(10) Patent No.: US 6,370,236 B1
(45) Date of Patent: Apr. 9, 2002

(54) REMOTELY OPERABLE TELEPHONE ANSWERING DEVICE AND METHOD OF OPERATION THEREOF

(75) Inventors: Joseph M. Cannon, Harleysville; Arupratan Gupta, Allentown; James A. Johanson, Macungie, all of PA (US)

(73) Assignee: Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/119,996

(22) Filed: Jul. 21, 1998

(51) Int. Cl.$^7$ ............................................... H04M 1/64
(52) U.S. Cl. ..................................... 379/74; 379/102.01
(58) Field of Search ........................... 379/67.1, 74, 77, 379/79, 81, 82, 177, 178, 179, 102.01, 102.02, 106.01, 106.03

(56) References Cited

U.S. PATENT DOCUMENTS

| | | | | |
|---|---|---|---|---|
| 5,579,377 A | * | 11/1996 | Rogers | 379/74 |
| 5,623,537 A | * | 4/1997 | Ensor et al. | 379/67 |
| 5,633,917 A | * | 5/1997 | Rogers | 379/74 |
| 5,978,451 A | * | 11/1999 | Swan et al. | 379/88.24 |

* cited by examiner

*Primary Examiner*—Scott L. Weaver

(57) ABSTRACT

A telephone answering device (TAD) and a method of controlling such TAD. In one embodiment, the TAD includes: (1) an external interface couplable to a telephone line outbound from a site, (2) an internal interface couplable to a client telephone and (3) decode circuitry, associated with the internal interface, that interprets affirmative commands received from the client telephone to allow the client telephone to control the TAD.

20 Claims, 3 Drawing Sheets

REMOTELY OPERABLE TELEPHONE ANSWERING DEVICE AND METHOD OF OPERATION THEREOF

TECHNICAL FIELD OF THE INVENTION

The present invention is directed, in general, to telecommunication devices and, more specifically, to a remotely operable telephone answering device and a method of operating the same.

BACKGROUND OF THE INVENTION

Voicemail has enhanced communications capability, in the modern environment, by allowing the user to both receive and send recorded voice messages when one of the communicating parties is not available at the moment. In fact, much of the flow of contemporary commerce and the transaction of business depends on stored voice messages. Equally important to modern life styles is the ability to send and receive non-business messages that are of a personal nature relating to family, friends or community involvement.

Personal voicemail is often supplied by an answering service that is external to a facility, such as a residence, or by telephone answering devices such as answering machines inside the residence. External answering services provide many beneficial features such as the ability to access the stored voice messages from any telephone. Additionally, these external answering services may also provide notification to a user's pager that a voicemail message has been received. The downside to external answering services is that they have an ongoing monthly service fee.

Answering machines, on the other hand, may be purchased for a nominal one-time cost and installed in the residence. Answering machines have become highly reliable and even provide digital, tapeless recording supported by voice time coding of the recorded message as well as other desirable features. They are easily installed at a telephone outlet, typically next to a telephone, without the need for additional telephone wiring. To retrieve messages, the user must gain access to the features of the answering machine either manually at the machine or remotely offsite using an access code for messages.

Answering machines may, of course, be used with a wide range of telephones including cordless units. Answering machines typically do not interfere with Caller ID. Additionally, speaker phones may have both built in Caller ID and answering capability. Some sites may even use multiple cordless handsets all connected to a single base station. However, all of these environments generally suffer from the inability to command the answering machine while on site but remote from the answering machine. What is needed in the art is a way to connect a telephone answering device that allows expanded capability and control with minor site modifications.

SUMMARY OF THE INVENTION

To address the above-discussed deficiencies of the prior art, the present invention provides a TAD and a method of controlling the TAD. In one embodiment, the TAD includes: (1) an external interface couplable to a telephone line outbound from a site, (2) an internal interface couplable to a client telephone and (3) decode circuitry, associated with the internal interface, that interprets affirmative commands received from the client telephone to allow the client telephone to control the TAD.

The present invention therefore introduces what amounts to a TAD-based telephone system that is local to a given site, for instance, a residence. The TAD forms, in effect, a server for the system, recording and playing back messages under control either locally or from any telephone coupled to the TAD via its internal interface.

"Affirmative command" is defined, for purposes of the present invention, as a signal transmitted from the telephone to the TAD that a user specifically intends to direct the TAD to take an action. A telephone "hookstate" (literally, the state of the telephone's hook: "off-hook" or "on-hook") is not an affirmative command, because changing the hookstate of a telephone is necessary to making or ending a call and is therefore neither intentional nor affirmative. In one embodiment of the present invention, the affirmative commands may be embodied as one or more dual-tone multifrequency (DTMF) tones, as a conventional telephone might generate. Of course, other forms of affirmative commands are within the broad scope of the present invention.

In one embodiment of the present invention, the internal interface is a wireless interface. Alternatively, the internal interface may be a wire-based interface.

In one embodiment of the present invention, the internal interface is a two conductor interface couplable to an unused wire-pair at the site. Those skilled in the art are aware that many residences are equipped with two pairs of wires, but that the majority of those residences only use one of the two wire-pairs. The present invention can employ the remaining, unused wire-pair for intra-site communication with one or more telephones.

In a more specific embodiment of the present invention, the client telephone is coupled to a wire-pair separate from the unused wire-pair for communication of voice signals. In one embodiment to be described, the path for communicating affirmative commands to the TAD differs from the path for carrying voice traffic from the telephone to the outbound telephone line. In fact, the unused wire-pair can be employed exclusively to carry affirmative commands.

In one embodiment of the present invention, the internal interface is a four conductor, wire-based interface. Thus, the present invention contemplates an embodiment wherein four wires couple the TAD to one or more telephones. Although this embodiment may require some modification to standard residential wiring, transmission rates between the TAD and the telephone(s) can increase dramatically.

In one embodiment of the present invention, the TAD detects a hookstate of the client telephone via the internal interface. In an embodiment to be illustrated and described, the TAD ceases to answer a call or play or record messages when it detects that a telephone coupled to its internal interface has gone off-hook.

In one embodiment of the present invention, the TAD further includes call completion circuitry, associated with the external interface, that completes a call via the telephone line on behalf of the client telephone. Thus, the TAD may act as a proxy for making or completing calls on behalf of the telephone(s) coupled to its internal interface. Of course, such need not be the case.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
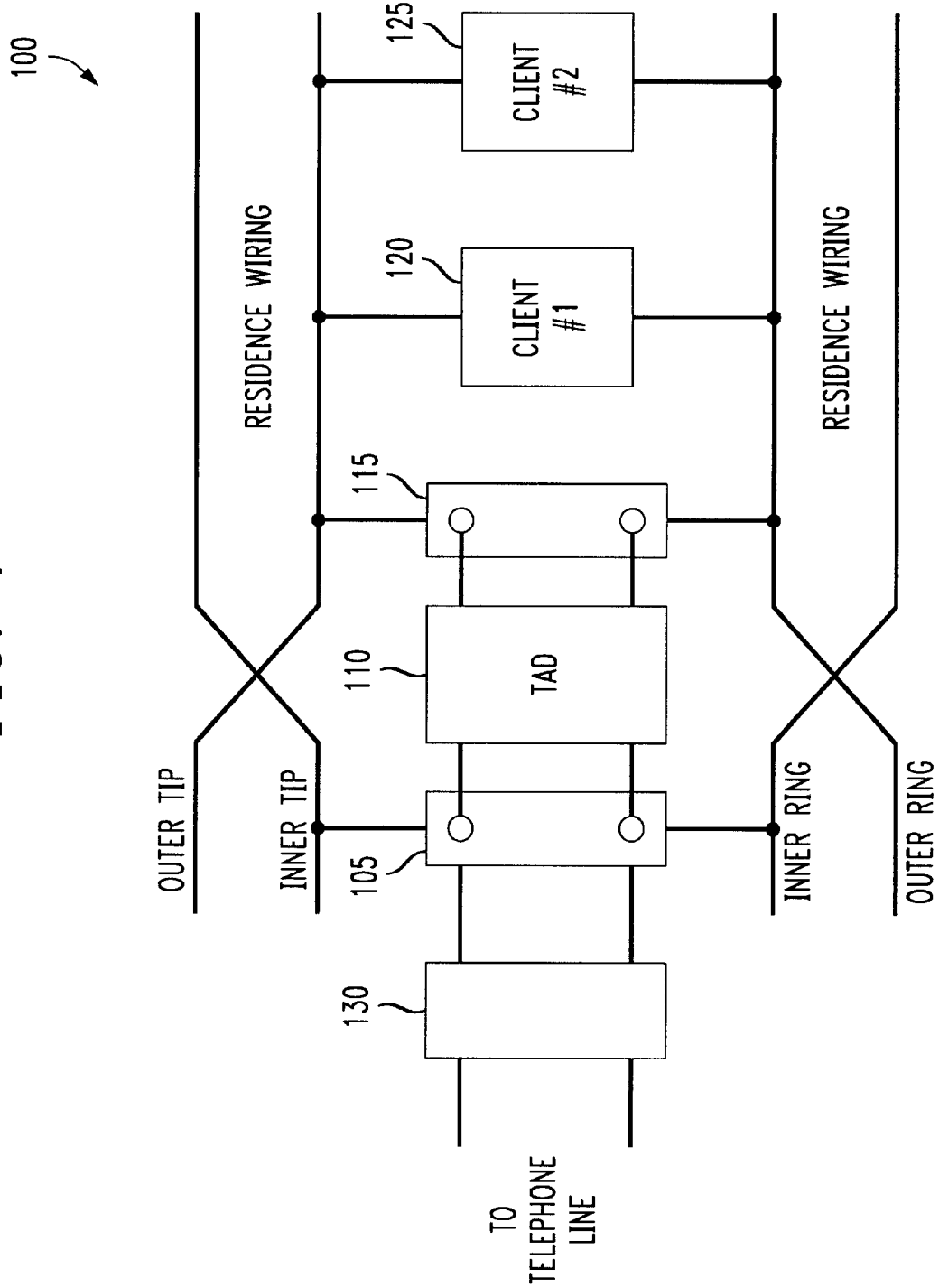
FIG. 1 illustrates a block diagram of a first system constructed according to the principles of the present invention in which a TAD is coupled alongside external telephone lines and internal residence wiring.

Referring initially to FIG. 1, illustrated is a system 100 in which a TAD is coupled between external telephone lines and internal residence wiring. The system 100 includes an external interface 105, a TAD 110, an internal interface 115, a first client telephone 120, a second client telephone 125 and an external transformer 130. The TAD includes the external interface 105 coupled to a telephone line outbound from the site, and the internal interface 115 coupled to the first and second client telephones 120, 125. Decode circuitry, associated with the internal interface 115, interprets affirmative commands received from the client telephones 120, 125 to allow the client telephones 120, 125 to control the TAD 110.

The present invention therefore introduces what amounts to a TAD-based telephone system that is local to a given site which, in this embodiment, is a residence. The TAD 110 forms a server for the system 100, recording and playing back messages under control either locally or from any client telephone coupled to the TAD 110 via the internal interface 115.

An affirmative command is transmitted from the first or second client telephone 120, 125 as a signal to the TAD 110 when a user specifically intends to direct the TAD 110 to take an action. A telephone hookstate, although not an affirmative command, is necessary however, to making or ending a call and is therefore neither intentional nor affirmative as discussed earlier. In this embodiment of the present invention, the affirmative commands may be one or more DTMF tones, as might be generated by a conventional telephone. Of course, other forms of affirmative commands are within the broad scope of the present invention.

The internal interface 115 may be either a wireless interface, such as the base station used with a cordless phone, or it may be a wire-based interface. For the wire-based option shown in FIG. 1, the internal interface 115 may be a two conductor interface coupled to an unused wire-pair already existing at the site. The TAD 110 occupies the first phone outlet position entering the residence from the outside, in this example, which shows the two existing phone lines being crossed over or switched in this phone outlet. An optional wiring scheme crosses the existing phone lines prior to the first phone outlet (e.g., at the external transformer 130) thereby allowing the TAD 110 to be placed at any phone jack position in the residence. In this embodiment, the client telephones 120, 125 are coupled to a wire-pair (outer tip, outer ring) separate from the unused wire-pair for communication of voice signals.

In this embodiment, the path (inner tip, inner ring) may also be used for communicating affirmative commands to the TAD 110 differing from the path for carrying voice traffic (outer tip, outer ring) from the client telephones 120, 125 to the outbound telephone line. In fact, the unused wire-pair can be employed exclusively to carry affirmative commands, if so desired. The present invention may also employ the remaining, unused wire-pair for intra-site communication with one or more telephones, if desired.

The internal interface 115 may also be a four conductor, wire-based interface. This allows the present invention to contemplate an embodiment wherein four wires couple the TAD 110 to one or more client telephones. Although this embodiment may require some modification to standard residential wiring, transmission rates between the TAD 110 and the client telephones it serves can increase dramatically.

The internal interface 115 may also be a wireless interface. Of course; the use of cordless phones as client telephones in the wire-based interface discussed above is perfectly acceptable. The wireless interface is particularly applicable, however, when only one base station is employed that uses multiple handsets as the telephone system. This would require having only one phone outlet where the base station and TAD 110 would reside.

The TAD 110 detects a hookstate of the client telephones 120, 125 via the internal interface 115. The TAD 110 ceases to answer a call or play or record messages when it detects that one of the client telephones 120, 125 coupled to its internal interface 115 has gone off-hook. The TAD 110 routes an incoming call, if present, to the off-hook client phone, or routes the client phone to the telephone line unless it recognizes an affirmative command for other action.

The TAD 110 further includes call completion circuitry, associated with the external interface 105, that completes a call via the telephone line on behalf of the client telephones 120, 125. Thus, the TAD 110 may act as a proxy for making or completing calls on behalf of the client telephones 120, 125 coupled to its internal interface 115. Of course, such need not be the case.

Figure 2:
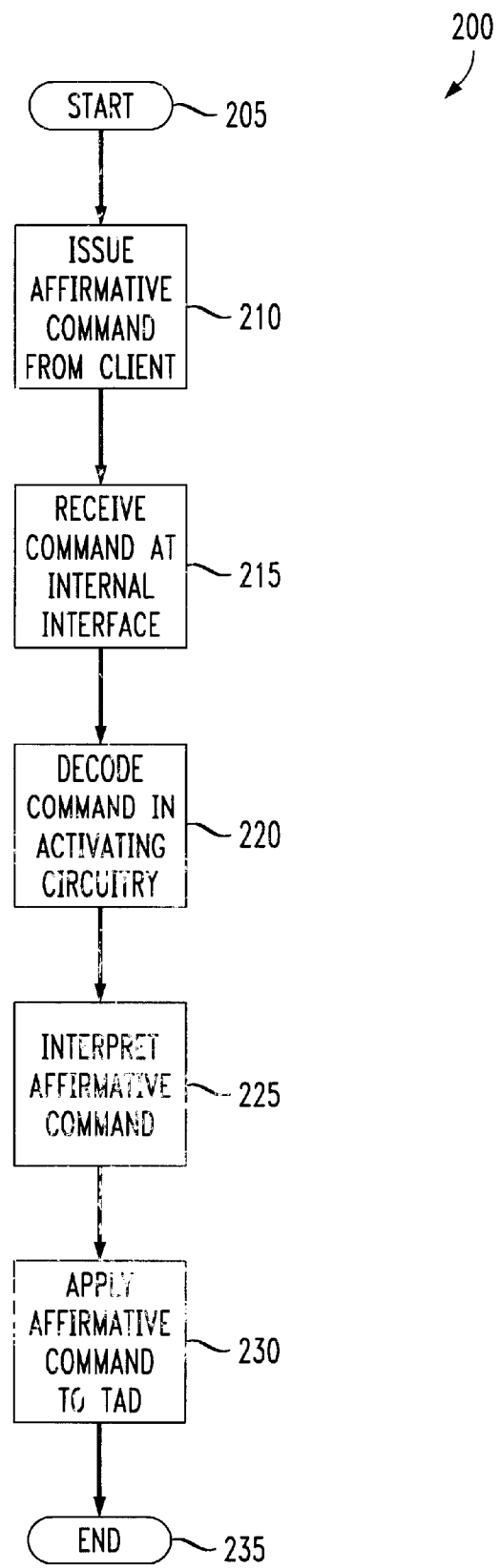
FIG. 2 illustrates a method of controlling a TAD according to one embodiment of the present invention.

Turning now to FIG. 2, illustrated is a method of controlling a TAD according to one embodiment of the present invention. A flow chart 200 illustrates the steps of coupling an internal interface of the TAD to a client telephone and activating decode circuitry, associated with the internal interface, to interpret affirmative commands received from the client telephone that allow the client telephone to control the TAD.

The method begins in a step 205, wherein a client telephone which is coupled to a wire-pair separate from an unused wire-pair for communication of voice signals is placed off-hook. Then, an affirmative command is entered into the client telephone via the touch pad producing DTMF tones in a step 210, to direct an action to the TAD. The hookstate of off-hook and these affirmative commands are received by the internal interface in step 215. The internal interface may be a wireless interface, a wire-based interface coupled to an unused two conductor wire-pair at the site or a wire-based interface that uses four conductors. The affirmative command is decoded by the activating decode circuitry associated with the internal interface in a step 220, and the command is interpreted by the activating decode circuitry in a step 225. Next, in a step 230, the affirmative command is applied to the TAD for action. The method ends in an end step 235 where the TAD has been commanded and the appropriate action is being taken.

Figure 3:
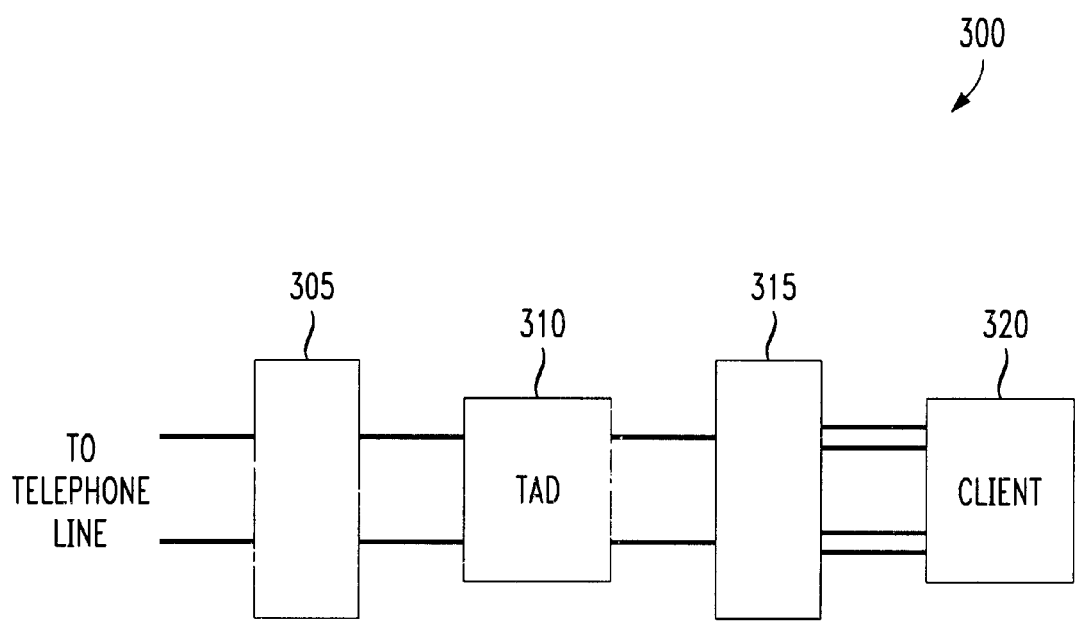
FIG. 3 illustrates a block diagram of a second system constructed according to the principles of the present invention in which a TAD is coupled between external telephone lines and internal residence wiring.

Turning now to FIG. 3, illustrated is a block diagram (generally designated 300) in which a TAD is coupled between external telephone lines and internal residence wiring. The diagram 300 includes a TAD 310 comprising an external interface 305 that is coupled to a telephone line outbound from a site, and an internal interface 315 coupled to a client telephone 320. DTMF decode circuitry, associated with the internal interface 315, interprets affirmative commands received from the client telephone 320 to allow the client telephone to control the TAD 310. Additionally, a hookstate detection circuitry, also associated with the internal interface 315, detects a hookstate of the client telephone 320. The external interface 305 includes call completion circuitry that completes a call via the telephone line on behalf of the client telephone 320.

The internal interface 315 may be a two conductor, wire-based interface coupled to an unused wire-pair at the site wherein the client telephone 320 may be coupled to a wire-pair separate from an unused wire-pair for communication of voice signals. Additionally, the internal interface 115 may be a four conductor, wire-based interface or even a wireless interface.

Although the present invention has been described in detail, those skilled in the art should understand that they can make various changes, substitutions and alterations herein without departing from the spirit and scope of the invention in its broadest form.

What is claimed is:

1. A telephone answering device (TAD), comprising:
   an external interface for coupling to a telephone line outbound from a site;
   an internal interface for coupling to a client telephone and an unused wire-pair at said site; and
   decode circuitry, associated with said internal interface, that interprets affirmative commands received from said client telephone to enable said client telephone to control said TAD.

2. The TAB as recited in claim 1 wherein said internal interface is a wireless interface.

3. The TAD as recited in claim 1 wherein said internal interface is a two conductor, wire-based interface.

4. The TAD as recited in claim 3 wherein said client telephone is coupled to a wire-pair separate from said unused wire-pair for communication of voice signals.

5. The TAD as recited in claim 1 wherein said internal interface is a four conductor, wire-based interface.

6. The TAD as recited in claim 1 wherein said affirmative commands are dual-tone multifrequency (DTMF) tones.

7. The TAD as recited in claim 1 wherein said TAD detects a hookstate of said client telephone via said internal interface.

8. A method of controlling a telephone answering device (TAD), comprising:
   coupling an internal interface of said TAD to a client telephone and an unused wire-pair at said site; and
   activating decode circuitry, associated with said internal interface, to interpret affirmative commands received from said client telephone to enable said client telephone to control said TAD.

9. The method as recited in claim 8 wherein said internal interface is a wireless interface.

10. The method as recited in claim 8 wherein said internal interface is a two conductor, wire-based interface.

11. The method as recited in claim 10 further comprising the step of coupling said client telephone to a wire-pair separate from said unused wire-pair for communication of voice signals.

12. The method as recited in claim 8 wherein said internal interface is a four conductor, wire-based interface.

13. The method as recited in claim 8 wherein said affirmative commands are dual-tone multifrequency (DTMF) tones.

14. The method as recited in claim 8 further comprising the step of detecting a hookstate of said client telephone via said internal interface.

15. A telephone answering device (TAD), comprising:
   an external interface for coupling to a telephone line outbound from a site;
   an internal interface for coupling to a client telephone and an unused wire-pair at said site;
   dual-tone multifrequency (DTMF) decode circuitry, associated with said internal interface, that interprets affirmative commands received from said client telephone to enable said client telephone to control said TAD; and
   hookstate detection circuitry, associated with said internal interface, that detects a hookstate of said client telephone.

16. The TAD as recited in claim 15 wherein said internal interface is a wireless interface.

17. The TAD as recited in claim 15 wherein said internal interface is a two conductor, wire-based interface.

18. The TAD as recited in claim 17 wherein said client telephone is coupled to a wire-pair separate from said unused wire-pair for communication of voice signals.

19. The TAD as recited in claim 15 wherein said internal interface is a four conductor, wire-based interface.

20. The TAD as recited in claim 15 further comprising call completion circuitry, associated with said external interface, that completes a call via said telephone line on behalf of said client telephone.

* * * * *